US006099002A

United States Patent [19]

Uchiyama

[11] Patent Number: 6,099,002
[45] Date of Patent: Aug. 8, 2000

[54] FOLDABLE WALKING-ASSISTANT DEVICE

[75] Inventor: Toshifumi Uchiyama, Amagasaki, Japan

[73] Assignee: Uchie Co., Ltd., Hyogo Prefecture, Japan

[21] Appl. No.: 09/396,537

[22] Filed: Sep. 15, 1999

[30] Foreign Application Priority Data

Nov. 5, 1998 [JP] Japan .................................. 10-314943

[51] Int. Cl.[7] ........................................................ B62M 1/00

[52] U.S. Cl. ..................... 280/87.021; 135/67; 74/551.1; 280/87.05

[58] Field of Search ......................... 280/87.021, 87.041, 280/650, 655.1, 87.05; 74/551.1, 551.3, 551.4; 135/67.7, 66.75, 85; 5/81.1 R, 662, 81.1 RP

[56] References Cited

U.S. PATENT DOCUMENTS 4,324,410 4/1982 Perego ...................................... 280/42
5,224,731 7/1993 Johnson .................................. 280/648
5,308,103 5/1994 Chin-Shung ............................ 280/655
5,328,183 7/1994 Counts ...................................... 280/42
5,354,022 10/1994 Coonrod .................................. 248/127
5,362,089 11/1994 Jyan-Tsai ............................ 280/655.1

*Primary Examiner*—Brian L. Johnson
*Assistant Examiner*—Tony Winner
*Attorney, Agent, or Firm*—Trapani & Molldrem

[57] ABSTRACT

A foldable walking-assistant device with which the handle's height can be properly adjusted according to the user's height. The device itself can be used as a chair. Moreover, the device can be folded and unfolded easily by the one-touch manner. A left and right leg body each consist essentially of the horizontal leg whose longitudinal length can be adjustable, the handle pipe which is vertically placed on the horizontal leg and is adjustable as to the height of the device, and the rear pipe which is provided at the handle pipe. The leg body possesses the folding mechanism combined with the associated action of the cross bar. The hand brake is installed at the handle pipe.

7 Claims, 6 Drawing Sheets

FOLDABLE WALKING-ASSISTANT DEVICE

BACKGROUND OF THE INVENTION

1. Field of the Invention

The present invention relates to a foldable walking-assistant device, which is an user-friendly auxiliary equipment for shopping or walking activities.

2. Description of Prior Arts

The conventional type of portable walking-assistant devices is generally characterized in that its height is fixed at a constant pre-set height and casters are mounted on legs portion. Since these types of conventional walking-assistant device do not possess a height-adjusting mechanism, the height of the handle cannot be adjusted depending upon the height (trunk height) of the user, resulting in an uncomfortable situation. Moreover, the conventional walking-assistant device is not equipped with any seat or sitting surface, so that people of advanced age, the handicapped, or persons suffering from weak legs or waist cannot use this type of device as an instant and temporary chair whenever they want to take a rest. This is a major drawback associated with the conventional types of walking-assistant device.

SUMMARY OF THE INVENTION

As a consequence, in order to overcome the problems and inconvenience associated with the conventional type of walking-assistant devices, it is an object of the present invention to provide a walking-assistant device with enhanced functionability and practicability. This and other objects are attained in accordance with the present invention wherein there is provided a walking-assistant device, with which the height of the handle can be properly adjusted in accordance to the (trunk) height of the user. Moreover, by providing the sitting surface, the device can be utilized as an instant and temporary chair. Furthermore, the present walking-assistant device is designed under a user-friendly concept in such a way that it can be folded by operating the folding mechanism.

One pair of left and right leg bodies, according to the present invention of a foldable walking-assistant device, is constructed with a horizontal leg portion with which the length along the back and forth direction can be adjusted, a handle pipe which is mounted vertically with respect to the horizontal leg portion and can adjust the height, and a rear pipe which mounted on the handle pipe. The pair of left and right leg bodies being combined with the cross bar forms a folding mechanism, by which the walking-assistant device can be folded along its width direction. Furthermore, a foldable seat forming as a sitting surface is provided at the handle pipe portion having a folding mechanism, and the hand brake is mounted on the handle. The main structural elements of the foldable walking-assistant device according to the present invention are an expandable pipe consisting essentially of a short-span pipe and a long-span pipe which is placed slidably inside the short-span pipe in a horizontal direction, two fixture pipes in front and back positions which are placed vertically to the short-span pipe in the expandable pipe, and a handle pipe which is placed slidably inside the fixture pipe along the vertical axis direction and the upper portion of said front pipe is connected to the upper portion of the slidable back pipe in a manner of forming a T-shape. An expandable vertical leg post having a height adjusting function is provided at the back side fixture pipe. The L-shaped rear pipe which is connected to the expandable vertical leg post in a manner that it can expand slightly wider than the horizontal legs is mounted. Moreover, a connecting arm for a reinforcement purpose is provided between the L-shaped rear pipe and the vertical leg post. A pair of left and right horizontal legs being constructed with providing casters at front end portion of the long-span pipe and at the lower end portion of the L-shaped rear pipe is connected in a foldable manner through a horizontal cross pipe in which two pipes are horizontally placed in order to form the X-shape, one end thereof is connected to the front end portion of the short-span pipe while the other end is connected to the back end portion of the slidable long-span pipe. Between the handle pipe which is vertically placed to the left and right short-span pipes in the horizontal leg, a vertical cross pipe is mounted in which the two pipes are placed vertically in the X-shaped form, one end thereof is foldably in its width direction to the root section of fixture pipe and the other end is provided to the upper portion of the front side of fixture pipe through an arm which is rotatable pivotally in vertical direction. A seat receiving component which is foldable in a vertical direction is provided to the seat pipe which is mounted horizontally at the back side of two fixture pipes being placed vertically to said horizontal leg portion. The seat can be detachably placed to the seat receiving component. Furthermore, the hand brake with a rear-wheel controlling mechanism is provided to the handle pipe. The hand brake has a locking mechanism in order to maintain the controlled condition, or can be used for installing a detachable basket at the front side portion of the vertical cross pipe which is formed in the X-shape.

The above and many other objectives, features and advantages of the present invention will be fully understood from the ensuing detailed description of the embodiments of the invention, which description should be read in conjunction with the accompanying drawings.

DETAILED DESCRIPTION OF PREFERRED EMBODIMENTS

Figure 1:
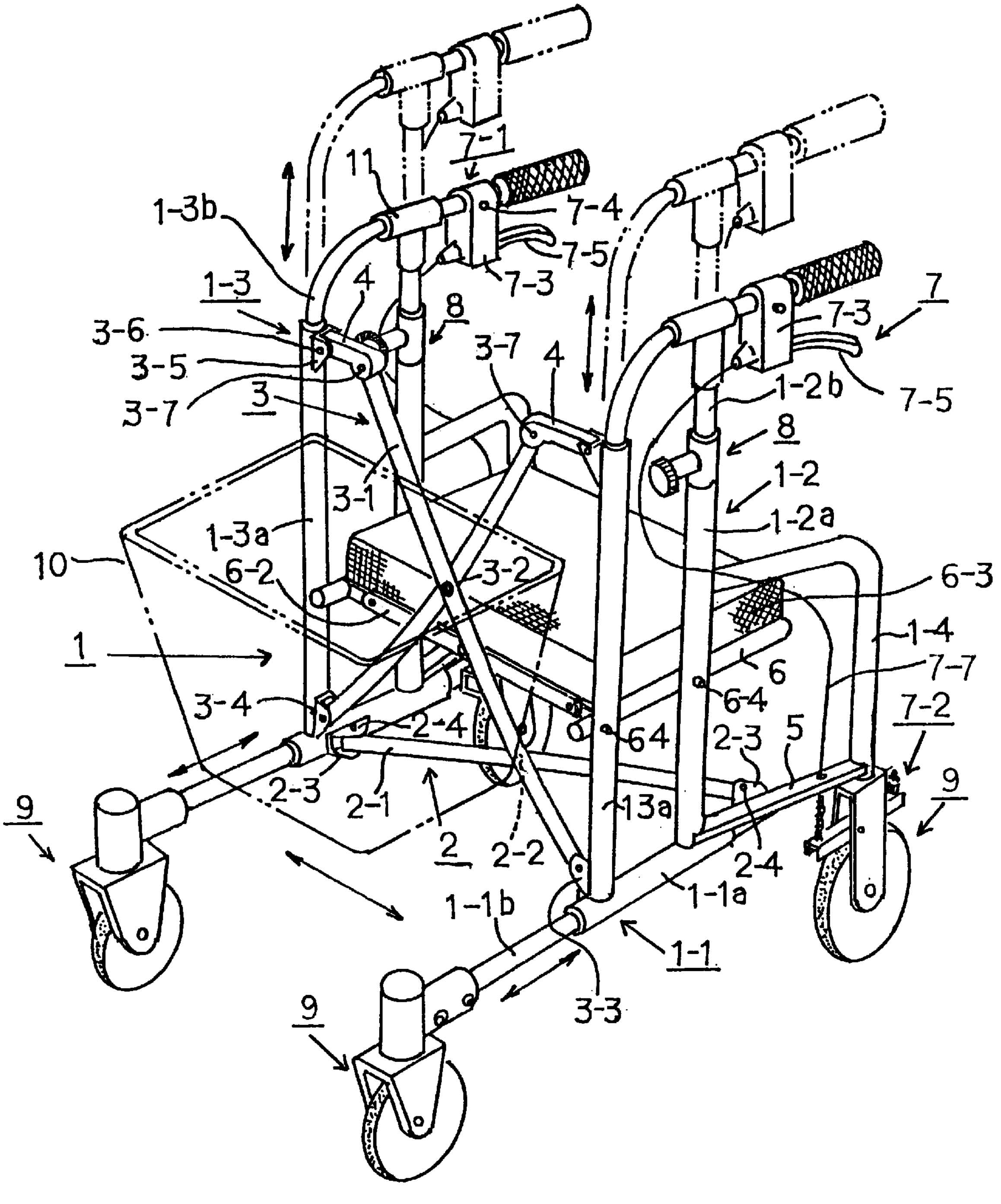
FIG. 1 is a perspective view of one example of the foldable walking-assistant device according to the present invention.
Figure 2:
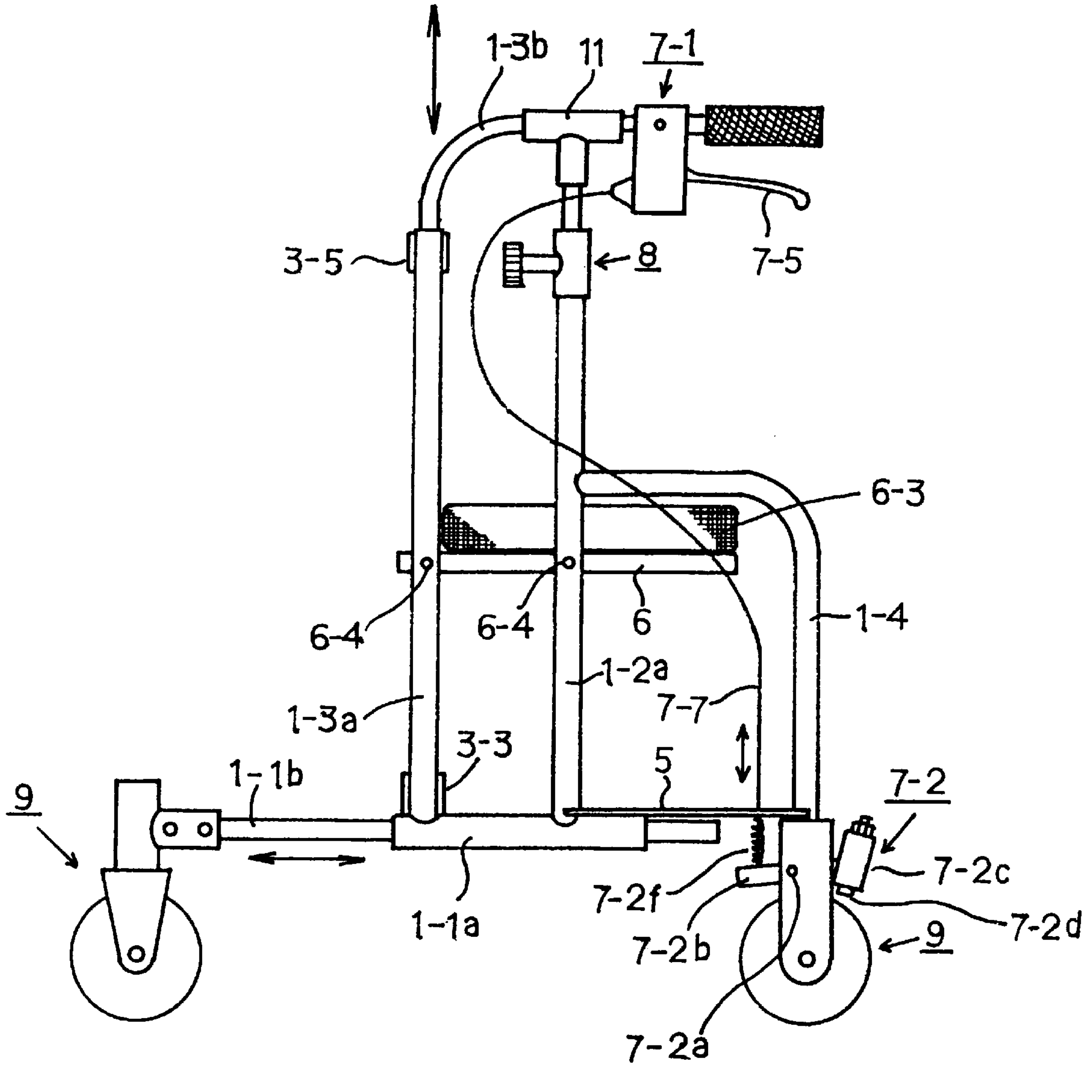
FIG. 2 is a side view of the foldable walking-assistant device shown in FIG. 1.

In the attached Drawings figures, there are a pair of left and right leg body 1, a horizontal leg (made of a round pipe) 1-1, a vertical leg post (made of a round pipe) 1-2, a handle pipe (made of a round pipe) 1-3, a rear pipe (made of a round pipe) 1-4, a horizontal cross bar (made of a round pipe) 2, a vertical cross pipe (made of a round pipe) 3, a movable arm 4, a connecting arm for reinforcement 5, a seat pipe (made of a round pipe) 6, a hand brake 7, a height adjusting device 8, a caster 9, and a basket 10.

The pair of left and right leg bodies 1 is constructed of the horizontal leg 1-1, the vertical leg post 1-2, the handle pipe 1-3, the rear pipe 1-4, the horizontal cross pipe 2 and the vertical cross pipe 3. The horizontal leg 1-1 is an expandable structure being consisted of a short-span pipe 1-1*a* and a long-span pipe 1-1*b* which the latter is inserted slidably into the short-span pipe along the horizontal direction. The vertical leg post 1-2 is formed with a fixture pipe 1-2*a* which is vertically placed on the short-span pipe 1-1*a* in the expandable pipe and a movable pipe 1-2*b* which is inserted slidably into the fixture pipe. Casters 9 are installed only at the front sides of long-span pipe 1-1*b* of the horizontal leg 1-1.

The handle pipe 1-3 is constructed with the fixture pipe 1-3 which is vertically provided at the short-span pipe 1-1*a* of the expandable pipe with a certain distance away from the vertical leg post 1-2, and the movable pipe 1-3*b* which is inserted slidably into the fixture pipe. The movable pipe 1-3*b* is bend rectangularly toward the vertical leg post 1-2 side and connected to the vertical leg post 1-2 through the T-shaped connecting component 1-1, so that the handle pipe 1-3 is supported with the vertical leg post 1-2. As a result, both the vertical leg post 1-2 and the handle pipe 1-3 can move vertically along with the movable pipes 1-2*b*, 1-3*b*, so that the handle height can be properly adjusted to the desired height through the height adjustment device 8 which is installed on the vertical leg post side 1-2.

Figure 4:
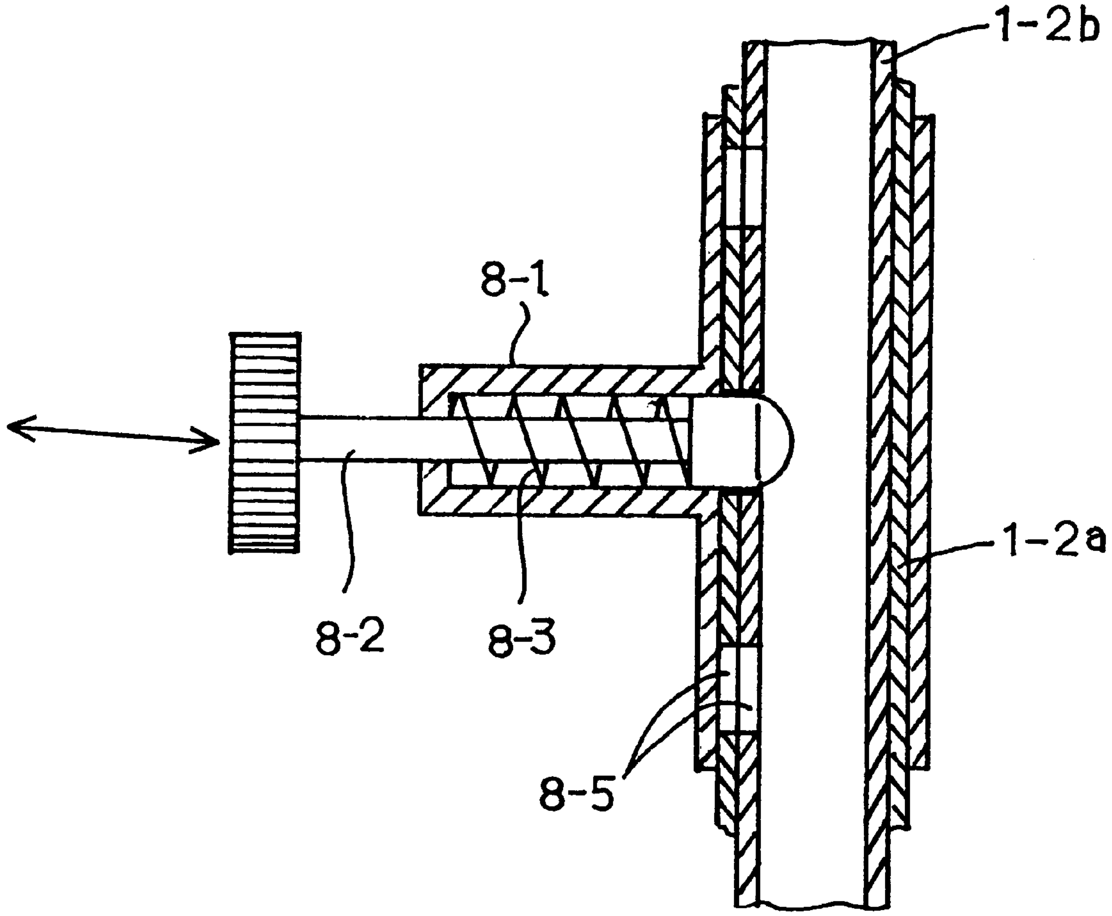
FIG. 4 is a vertical cross sectional expanded view of the height adjustment device in the foldable walking-assistant device shown in FIG. 1.

The height adjustment device 8, as seen in an expanded view in FIG. 4, applies always a pushing force to a guide tube body 8-1 which is provided horizontally at the fixture pipe 1-2*a*, particularly to the pin 8-2 which is mounted slidably in a horizontal direction with respect to the fixture pipe, so that the pushing force can be acting always onto the movable pipe side 1-2*b* through a compression spring 8-3 which is inserted and engaged inside the guide tube body 8-1. When the pin 8-2 is pulled outwardly against the compression spring 8-3, the tip portion of the pin separates itself from the movable pipe 1-2*b*, so that the movable pipe 1-2*b* will become slidable. On the other hand, if the pin 8-2 is released, the pin will push-in the movable pipe 1-2*b* through the force generated by the compression spring 8-3. On both fixture pipe 1-2*a* and movable pipe 1-2*b*, height adjustment holes 8-5 are provided at certain intervals.

A single pipe is bent into an L-shape to form the rear pipe 1-4. The rear pipe is connected and fixed to the fixture pipe 1-2*a* of the vertical leg post 1-2 in such a manner that it expands slightly wider than the horizontal leg 1-1. Under the rear pipe 1-4, the rear casters 9 are installed. The connecting arm 5 for reinforcement is horizontally provided between the lower end portion of the rear pipe 1-4 and the root portion of the fixture pipe 1-2*a* of the vertical leg post 1-2.

The horizontal cross pipe 2 is constructed with two inter-crossing pipes 2-1 in an X-shape, and the intersecting point is pivoted rotatably on the horizontal plane. Both end potions of these horizontal pipes 2-2 are pivoted rotatably to the short-span pipe 1-1*a* of the horizontal pipe 1-1 which is constructed with the expandable pipe and bracket 2-3 which is provided on the inner surface of the long-span pipe 1-1*b*, so that the pair of left and right horizontal legs 1-1 can be folded in the width direction.

The vertical cross pipe 3 is formed by inter-crossing two pipes 3-3 in an X-shape, and intersecting point is pivoted rotatably in vertical direction by the pin 3-2. The lower potions of each pipe of the vertical cross pipe 3-2 are pivoted rotatably to the bracket 3-3, which is provided to the root portion of the fixture pipe 1-3*a* of the handle pipe being placed vertically to the short-span pipe 1-1*a* of the horizontal leg 1-1, by the pin 3-4. One end portion of the upper portion thereof is rotatably pivoted through the pin 3-7 to the other end of the movable arm whose one end portion is pivoted rotatably in a horizontal direction to the bracket 3-5, which is provided at the upper portion of the fixture pipe 1-3*a*, by the pin 3-6.

The seat pipe 6 is installed in the space provided between the fixture pipe 1-2*a* of the pair of left and right vertical leg bodies 1-2 and the fixture pipe 1-3*a* through the bolt 6-4. Both end portions of seat-receiving component 6-2, which is bendable into two-fold, are mounted to the seat pipe 6. One side of the seat 6-3 is placed rotatably to the seat-receiving component 6-24 2.

Figure 5:
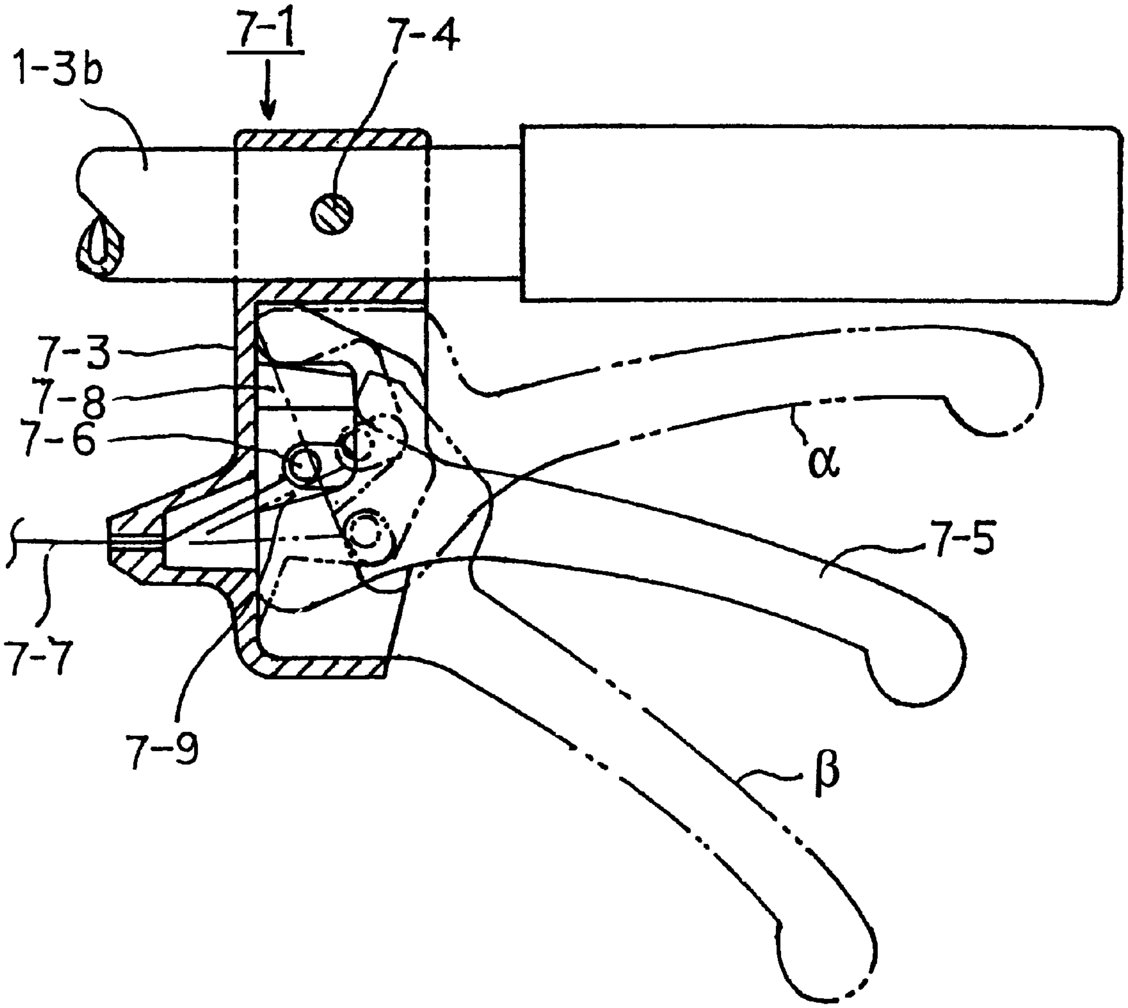
FIG. 5 is a cross sectional expanded view of the brake lever portion of the hand brake of the foldable walking-assistant device shown in FIG. 1.
Figure 6:
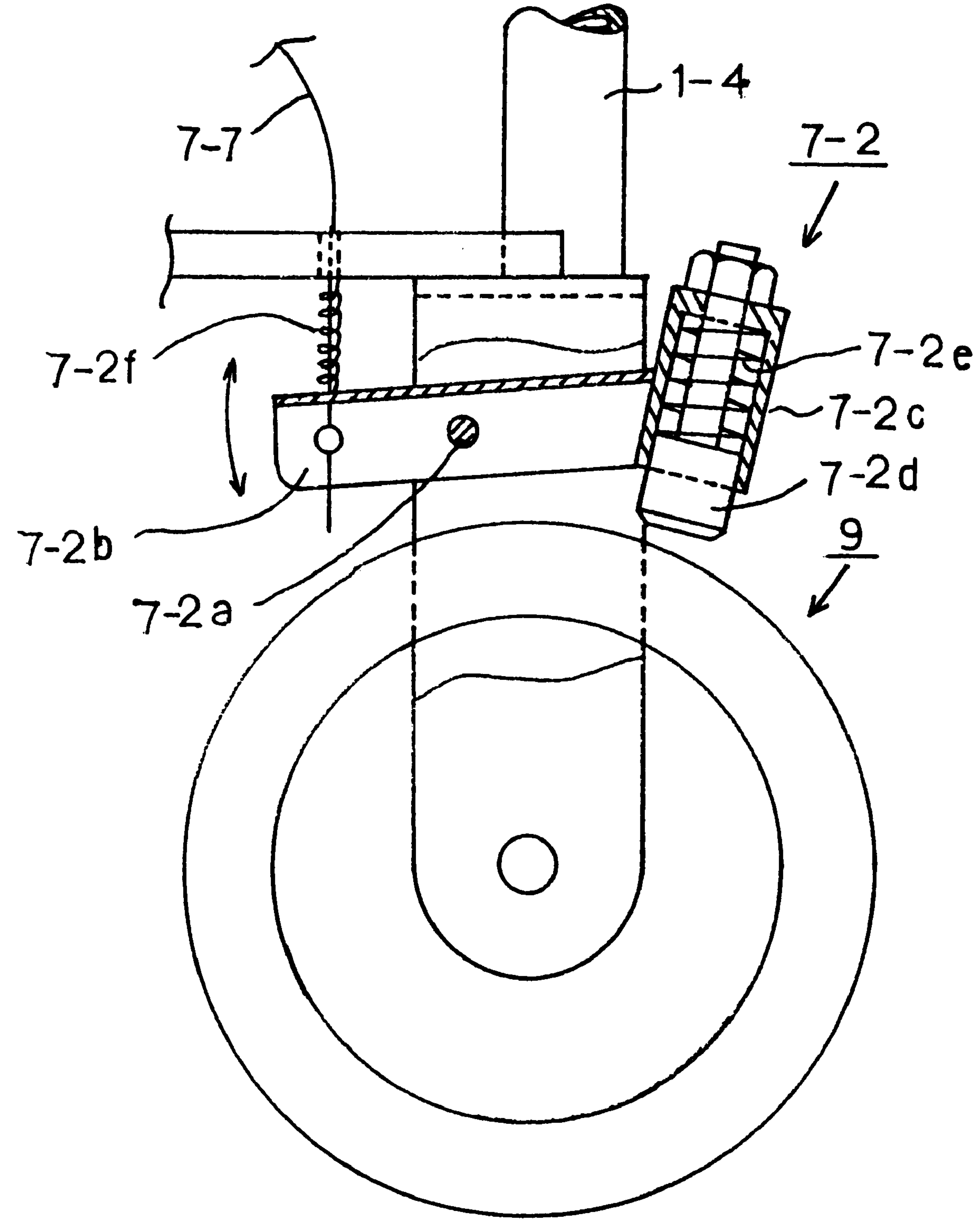
FIG. 6 is an expanded partially cross sectional view of rear wheel controlling portion in the hand brake of the foldable walking-assistant device shown in FIG. 1.

The hand brake 7 has a controlling system to control the rear wheels by the handle portion using the wire brake which is commonly employed in the bicycles. The hand brake 7, as seen in FIGS. 5 and 6, is consisted essentially of a brake lever portion 7-1 which is installed at the holding portion of the handle pipe 1-3 and a controlling mechanism portion 7-2 which controls the casters (rear sides) 9 which are installed to the rear pipe 1-4. At the brake lever portion 7-1, the brake lever 7-5 is provided to the box-shaped brake case 7-3 which is inserted outside of the holding portion of the handle pipe 1-3 and is fixed with screws 7-4. The wire 7-7 is connected to the pin 7-6 which is placed to the base portion of the brake lever 7-5, so that the brake lever 7-5 is always subjected to a pulling action. On the other hand, in the controlling mechanism portion 7-2, the controlling pin 7-2*d* being supported by the coil spring 7-2*e* is provided to the tube portion 7-2*c*, which is placed at one end portion of the jig component 7-2*b* which is pivoted rotatably to the casters on the rear pipe 1-4, by the supporting pins 7-2*a*. The wire 7-7 is connected to the end portion of the jig component by the spring 7-2*f*. With this structure, when the wire 7-7 is pulled, the jig component 7-2*b* rotates with the supporting pin 7-2*a* with respect to its rotating pivot-point, so that the controlling pin 7-2*d* pushes against the rear wheels.

In the structure of the brake lever portion 7-1, a recess portion 7-9 which is provided at the root portion of the brake lever 7-5 is engaged, in a manner of matching of concave and convex surfaces, to one pair of lever 7-8 which is extruded to the inner wall of the brake case 7-3. Moreover, the brake lever 7-5 is always in a position of being pulled by the wire 7-7 which is connected to the pin 7-6 which is provided at the recess portion 7-9. At the non-controlling position (neutral position), the brake lever 7-5 is on the position illustrated with a solid line in FIG. 5. Upon squeezing the brake lever 7-5 to activate the braking function, the brake lever 7-5 rotates to a position with broken line $\alpha$, and by releasing the brake lever 7-5, the lever will return back to its original position (with the solid line). If the brake lever 7-5 is rotated backward in an opposing direction from the controlling action, the recess portion 7-8 which is provided at the root portion of the brake lever 7-5 exceeds the rib 7-8 to be at a position with broken line $\beta$. A the same time, one lower end portion of the recess portion 7-9 becomes to be in contact to the rib 7-8, so that the locking action is activated and the controlled position will be maintained.

The basket 10 is detachable to the vertical cross pipe 3. As one example for placing the basket, the basket can be mounted using the bolt-and-nut means with which the pin 2-2, which pivots the cross portion of two pipes 2-1, can be employed.

In the aforementioned foldable walking-assistant device, FIG. 1 shows the position when the device is opened (normal condition under usage), and the distance in its width direction is supported by the horizontal cross pipe 2 and vertical cross pipe 3. At this moment, the long-span pipe 1-1*b* of the horizontal leg 1-1 exceeds beyond the short-span pipe 1-1*a*. Moreover, the seat 6-3 is supported horizontally at back side of the main body, so that an user can sit on the seat while taking a rest. The height of the handle can be controlled by adjusting the height of movable pipe 1-2*b*, 1-3*b* of respective vertical leg post 1-2 and handle pipe 1-3 by manipulating the height adjustment device 8. When the walking assistant device is needed to be set in the stopping position or the user wants to sit on the seat, the brake lever 7-5 should turn to the position shown with the broken line β in FIG. 5 and the controlling position should be locked.

Figure 3:
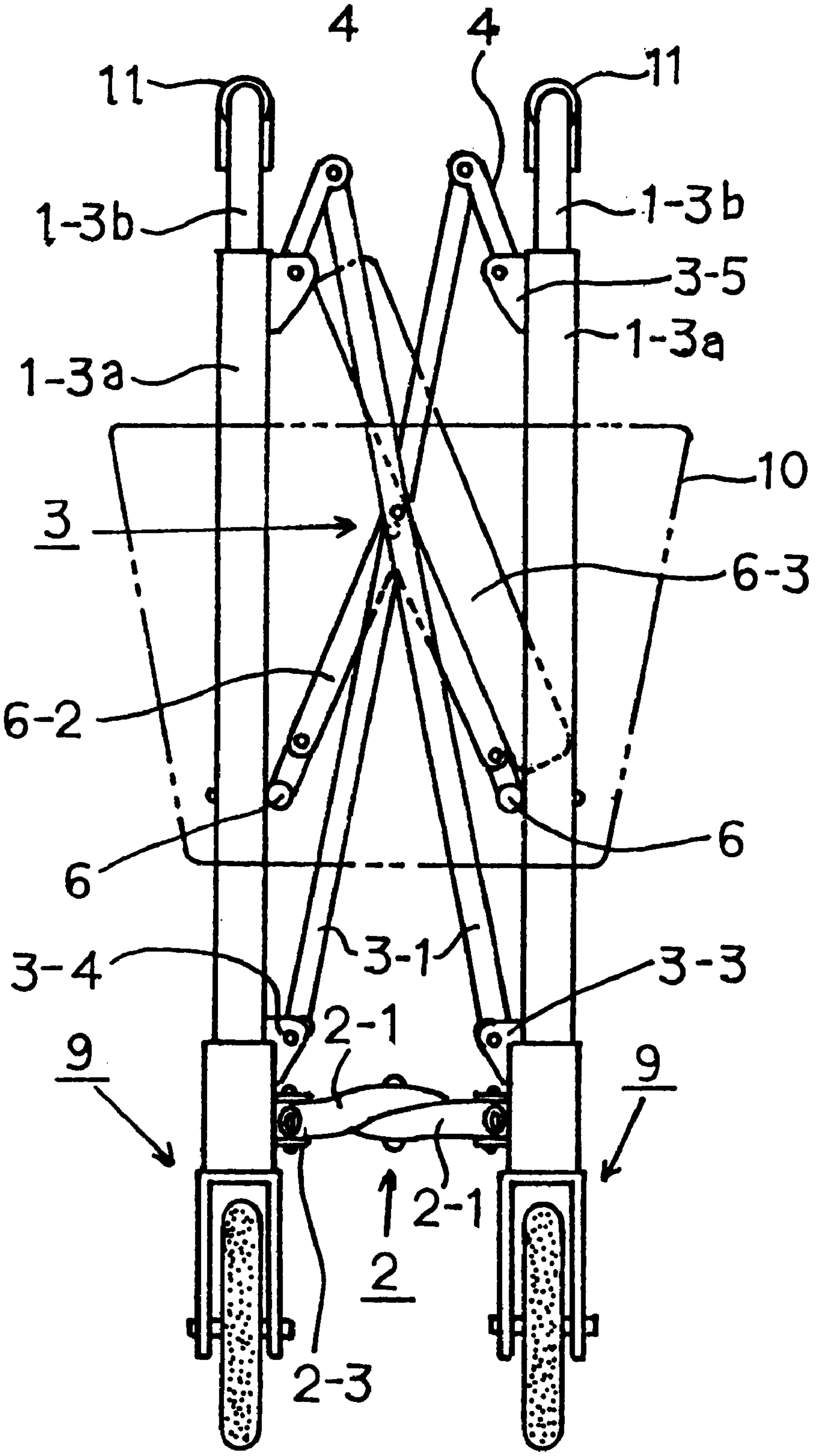
FIG. 3 is a front view of the folded position of the walking-assistant device shown in FIG. 1.

In the next, if the device is needed to be folded, the seat-receiving component 6-2 is bent upwardly or downwardly into the two-fold manner. The seat 6-3 will rise rotatably with one side with respect to a pivoting point. By the horizontal cross pipe 2 and vertical cross pipe 3 accompanying with the above rotating movement, a pair of left and right horizontal legs 1-1 and vertical leg post 1-2 are relatively pulled toward to each other and the seat will be gradually closed (folded). As a result, as seen in FIG. 3, the long-span pipe 1-1*b* of the horizontal leg post 1-1 will pull back beyond the short-span pipe 1-1*a* (in an opposite movement from the opening position), so that if the vertical cross pipe 3 is almost upright position, the folding process is nearly completed.

When the folded device is opened, reversely from the folding operation, the device can be opened by actions of the horizontal cross pipe 2 and vertical cross pipe 3 by applying the external force onto the pair of horizontal leg 1-1. At the same time, the foldable seat-receiving component 6-2 will be opened wider. When the seat-receiving component becomes flat, the horizontal cross pipe 2 and vertical cross pipe 3 are perfectly opened and this opening position will be maintained.

As mentioned in the above, the present foldable walking-assistant device adopts a folding mechanism in its width direction using the cross bar system, and a controlling mechanism for adjusting the handle's height. In addition to these unique functions, the present walking-assistant device having a foldable seat and hand brake exhibits the following listed effects and performance features.

1) Since the handle height can be controlled, the height can be comfortably adjusted according to the user's trunk height.
2) Since the seat is provided, whenever desired, especially for the advanced in age, the handicapped, peoples suffering from weak legs or waist can sit and, rest anytime.
3) Using the hand brake having a locking mechanism for the controlled position, the device can be easily kept at the stop position, and when the device will be used as a chair, the present device will be used in very safe and convenient ways.
4) Since the detachable basket can be installed, it is convenient for grocery shopping.
5) Since the device itself can be foldable along its width direction, it will be remarkably squeezed so that it is very convenient for storage.
6) Since the cross bar system is employed for the folding mechanism, the structure can be designed simpler and it is easily operated to open and close the legs by the one-touch operation.
7) Using the pipes for the structural components, the device body can be fabricated with light weight and higher strength, and therefore is easy to carry.

While this invention has been described with respect to preferred embodiments, it should be understood that the invention is not limited to that precise embodiments; rather many modifications and variation would present themselves to those of skill in the art without departing from the scope and spirit of this invention, as defined in the appended claims.

What is claimed is:

1. A foldable walking-assistant device comprising a horizontal expandable pipe which consists of a short-span pipe and a long-span pipe wherein the latter is inserted slidably inside of said short-span pipe in the horizontal direction;

a pair of front and back fixture pipes which are vertically mounted onto the short-span pipe of the expandable pipe; and a handle pipe which is inserted slidably inside the first fixture pipe in a vertical direction and the upper portion of the front side pipe is connected to the upper portion of a back side movable pipe that is inserted slidably inside the back fixture pipe, said upper portion being in a form of a T-shape, an expandable vertical leg post and an L-shaped rear pipe which is connected to a back side of the vertical leg post and angled slightly outwardly of the horizontal expandable pipe, a connecting arm for reinforcement purpose between the L-shaped rear pipe and the back side of the vertical leg post, a pair of left and right horizontal legs in which casters are installed, and disposed at the front end portion of the long-span pipe and at the lower end portion of the L-shaped rear pipe through a horizontal cross pipe in which two pipes are inter-crossed horizontally in an X-shape and one end thereof is connected to the front end portion of the short-span pipe and the other end is connected to the back end portion of the long-span pipe, a vertical cross pipe which is connected foldably between the handle pipes which are vertically placed relative to the pair of left and right short-span pipes through an arm in which two pipes are inter-crossed vertically in an X-shape and one end thereof is pivoted rotatably vertically to a root portion of the front side of the fixture pipe and the other end is pivoted rotatably vertically to the upper portion of the front side of the fixture pipe, a vertically foldable seat-receiving component pivotally mounted to a seat pipe which is horizontally mounted to the front and back fixture pipes and above the horizontal leg, a seat detachably mounted to the aforementioned seat-receiving component, and a rear-wheel controlling system including a hand brake mounted onto the handle pipe.

2. The foldable walking-assistant device cited in claim 1 wherein the aforementioned hand brake possesses a locking mechanism establishing a controlled position of the device.

3. The foldable walking-assistant device cited in claim 1 wherein a basket is placed in front of the vertical cross pipe which is inter-crossed in an X-shaped vertical direction.

4. The foldable walking-assistant device cited in claim 1 wherein the aforementioned height adjustment is constructed by a pin, which is provided at a guide tube body which is mounted horizontally to the fixture pipe, slidably in a rectangular position with respect to the fixture pipe and a compression spring which is inserted and engaged in the guide tube body to force the pin to apply the pushing force against the movable pipe side, so that the movable pipe can be in a slidable condition upon pulling the pin outwardly from the compression pin to cause the separate the tip portion of the pin away from the movable pipe; while the aforementioned movable pipe is pushed and fixed due to the force caused by the compression spring upon releasing the pin.

5. The foldable walking-assistant device cited in claim 4 wherein height adjustment holes are provided on both fixture pipe and movable pipe at certain intervals.

6. The foldable walking-assistant device cited in claim 1 wherein the hand brake comprises a brake lever portion which is installed at a holding portion of the handle pipe and a controlling mechanism portion to control the casters which are provided at the rear pipe; said brake lever portion being further constructed with a brake lever which is located in a box-type brake case being provided externally to the holding portion of the handle pipe and a wire being connected to a pin on the base portion of the brake lever portion so that the pulling position of the brake lever is always maintained; while said controlling mechanism portion further includes a control pin supported by a coil spring to a tube body which is provided at one end portion of a jig, the jig being pivotally mounted to rotate against the casters on the rear pipe, and the wire being connected to an end portion of the jig through the spring so that the control pin pushes against the casters upon pulling the wire to cause rotation of the aforementioned jig.

7. The foldable walking-assistant device as cited in claim 6 wherein the aforementioned brake lever portion is provided with a recess portion which is located at a root portion of the brake pipe and is engaged to a rib which is extruded at an inner wall of the brake case, in a concave-convex matching manner, and the brake lever is under constant tension by the wire being connected to the pin at the recess portion, so that the brake lever is at a middle position thereof at a non-controlling neutral condition, the brake lever rotates close to the handle upon braking, and it returns back to its original neutral position upon releasing the brake lever, and furthermore when the brake lever rotates in an opposite direction from the controlling position, the wire is pulled to be in the controlled position while the recess portion exceeds beyond the rib to a controlled position away from the handle pipe and a locking mechanism is thus activated to hold the controlled position by contacting the rib to the lower inner wall portion of the recess portion.

* * * * *

UNITED STATES PATENT AND TRADEMARK OFFICE

CERTIFICATE OF CORRECTION

PATENT NO. : 6,099,002
DATED : August 8, 2000
INVENTOR(S) : Toshifumi Uchiyama

It is certified that error appears in the above-identified patent and that said Letters Patent is hereby corrected as shown below:

In Col. 4, Line 12:

"component 6-24 2" should read --component 6-2--.

Signed and Sealed this

Twenty-second Day of May, 2001

Attest:

NICHOLAS P. GODICI

*Attesting Officer* *Acting Director of the United States Patent and Trademark Office*